(12) United States Patent
Smith (10) Patent No.: US 6,431,519 B1
(45) Date of Patent: Aug. 13, 2002

(54) AXIALLY ROTATED VALVE ACTUATION SYSTEM

(75) Inventor: Ronn G. Smith, Sheridan, WY (US)

(73) Assignee: Big Horn Valve, Inc., Sheridan, WY (US)

( * ) Notice: Subject to any disclaimer, the term of this patent is extended or adjusted under 35 U.S.C. 154(b) by 0 days.

(21) Appl. No.: 09/612,491

(22) Filed: Jul. 7, 2000

Related U.S. Application Data (60) Provisional application No. 60/143,046, filed on Jul. 7, 1999.

(51) Int. Cl.[7] ............................................. F16K 31/06
(52) U.S. Cl. .................................... 251/65; 251/129.01
(58) Field of Search ............................ 251/65, 129.01; 137/613

(56) References Cited

U.S. PATENT DOCUMENTS

| | | |
|---|---|---|
| 194,973 A | 9/1877 | Phillips |
| 222,680 A | 12/1879 | Dows |
| 286,508 A | 10/1883 | Vadersen et al. |
| 332,731 A | 12/1885 | Miller |
| 958,079 A | 5/1910 | Bennett |
| 960,675 A | 6/1910 | Murphy |
| 1,317,789 A | 10/1919 | Hoar |
| 1,334,870 A | 3/1920 | Lowry |
| 1,443,231 A | 1/1923 | McCauley |
| 1,556,979 A | 10/1925 | Uschman |
| 1,777,434 A | 10/1930 | Herzbrun |
| 2,198,455 A | 4/1940 | Mueller et al. |
| 2,304,303 A | 12/1942 | Ferguson |
| 2,507,467 A | 5/1950 | Fredrickson et al. |
| 2,508,958 A | 5/1950 | Manville |
| 2,750,962 A | 6/1956 | Kreitchman et al. |
| 2,767,019 A | 10/1956 | Manville |
| 2,822,818 A | 2/1958 | Breznick |
| 2,894,695 A | 7/1959 | Beltcher et al. |

(List continued on next page.)

FOREIGN PATENT DOCUMENTS

WO    WO 99/13250    3/1999

OTHER PUBLICATIONS

Cardin, J., Reinicke, R.H., and Bruneau, S., " A Lifting Ball Valve for cryogenic fluid applications", JHU, JANNAF Propulsion Meeting, 1993, vol. 2, pp. 297–312.

Cross Connection Control Handbook, Febco Industries, pp. 1–16.

(List continued on next page.)

*Primary Examiner*—Kevin Lee
(74) *Attorney, Agent, or Firm*—Santangelo Law Offices, P.C.

(57) ABSTRACT

The invention described herein is an electrically operated rotary actuator. It is intended primarily for use with the axially rotated VOST valve in applications requiring remote or automatic valve operation, although it may have other applications. The actuator delivers 180 degrees of angular displacement to the rotating member of the VOST valve, as required to open or close the valve. It also effects a small axial displacement to provide seal separation during rotation to minimize seal wear. The actuator is designed to produce low friction and a high torque-to-mass ratio relative to existing actuators. Once operated by an electric signal, the actuator is designed to latch in either the open or closed position without holding current or other externally applied energy.

5 Claims, 7 Drawing Sheets

U.S. PATENT DOCUMENTS

| | | |
|---|---|---|
| 2,949,240 A | 8/1960 | Koolnis |
| 2,977,988 A | 4/1961 | Drobilits et al. |
| 3,073,566 A | 1/1963 | Bredtschneider |
| 3,096,786 A | 7/1963 | Rost |
| 3,145,010 A | 8/1964 | Karr, Jr. |
| 3,176,720 A | 4/1965 | Donahue |
| 3,273,851 A | 9/1966 | Rosch, Jr. et al. |
| 3,424,189 A | 1/1969 | Woodford |
| 3,506,030 A | 4/1970 | Vesco |
| 3,521,667 A | 7/1970 | Johnson |
| 3,533,554 A | 10/1970 | Mongerson |
| 3,736,959 A | 6/1973 | Parkison |
| 3,749,355 A | 7/1973 | Paul, Jr. |
| 3,779,508 A | 12/1973 | Paul, Jr. |
| 3,848,806 A | 11/1974 | Samuelsen et al. |
| 3,954,250 A | 5/1976 | Grace |
| 4,022,243 A | 5/1977 | Edwards |
| 4,066,090 A | 1/1978 | Nakajima et al. |
| 4,117,856 A | 10/1978 | Carlson |
| 4,178,956 A | 12/1979 | Fillman |
| 4,200,124 A | 4/1980 | Stratynski et al. |
| 4,261,332 A | 4/1981 | Stewart |
| 4,301,972 A | 11/1981 | Rudelick |
| 4,316,481 A | 2/1982 | Fillman |
| 4,475,570 A | 10/1984 | Pike et al. |
| 4,483,361 A | 11/1984 | Jungbert, Sr. |
| 4,520,836 A | 6/1985 | Hutter, III |
| 4,532,954 A | 8/1985 | Fillman |
| 4,576,416 A * | 3/1986 | Mueller et al. ............... 303/15 |
| 4,672,247 A | 6/1987 | Madsen et al. |
| 4,691,135 A | 9/1987 | Sogabe et al. |
| 4,809,732 A | 3/1989 | Buehler |
| 4,844,116 A | 7/1989 | Buehler et al. |
| 4,899,073 A | 2/1990 | Takeuchi et al. |
| 4,903,578 A | 2/1990 | Terp |
| 4,976,237 A | 12/1990 | Bollinger |
| 5,004,157 A | 4/1991 | Martell |
| 5,087,868 A | 2/1992 | Ishibashi et al. |
| 5,148,895 A | 9/1992 | Kakizaki |
| 5,283,495 A | 2/1994 | Wendel et al. |
| 5,355,905 A | 10/1994 | Burgess et al. |
| 5,413,134 A | 5/1995 | Burgess et al. |
| 5,573,186 A | 11/1996 | Loschelder |
| 5,579,800 A | 12/1996 | Walker |
| 5,622,203 A | 4/1997 | Givier et al. |
| 5,786,649 A | 7/1998 | Everingham |
| 5,811,898 A | 9/1998 | Everingham |
| 5,842,680 A | 12/1998 | Bustamante et al. |
| 6,026,845 A | 2/2000 | Walrath et al. |
| 6,129,103 A * | 10/2000 | Fields et al. ............ 137/613 X |

OTHER PUBLICATIONS

Fox & McDonald, "Laminar and Turbulent Flows", Introduction to Fluid Mechanics, 1973, pp. 43–44, 312–313.

"Model B60, 65 and 25: Freezeless Wall Faucets", Woodford Mfg. Co. Brochure, rev. 6/91, 3 pages.

Munson, B., Young, D., and Okiishi, T., Fundamentals of Fluid Mechanics, 2d. ed., 1994, pp. 492–501, 555–559.

"Quarterhorse 1/4 Turn Non Freeze Wall Hydrant", Jay R. Smith Mfg. Co Brochure, 1990, 4 pages.

"Remote Mechanical Valve Actuator", McMaster Carr Co. Catalog, 1989.

"Rotary Solenoids", Ledex Manufacturing, (1999), pp. 2–4.

"Standard Port Bronze Apollo with Center Brain", Apollo advertisement.

"Watts Series TWS Wall Hydrant", Watts Regulator advertisement.

* cited by examiner

SW = Momentary 3 Position Switch
OLS = Open Limit Switch
CLS = Closed Limit Switch
VOR = Valve Open Relay
VCR = Valve Closed Relay
TDR1 = Time Delay Relay 1
TDR2 = Time Delay Relay 2
TDR3 = Time Delay Relay 3
TDR4 = Time Delay Relay 4

Fig. 2C

Timing Diagram – Open

Timing Diagram – Closed

AXIALLY ROTATED VALVE ACTUATION SYSTEM

This application claims the benefit of U.S. provisional application No. 60/143,046, filed Jul. 7, 1999, entitled "Electromagnetic Actuator for Axially Rotated Valve," hereby incorporated by reference.

BACKGROUND OF THE INVENTION

The invention relates generally to valve actuation systems which may be utilized as either apparatus for or method of actuating a valve. More particularly, the invention is intended to provide an improved system for actuating axially-rotated valves by providing actuation of the valve with single or multiple actuation features.

Rotary actuators have been used to control the positions of certain types of valves, rotary switches and other axially rotated mechanisms. The most prominent types of electrical rotary actuators may consist of rotary solenoids, stepper motors, synchronous motors and commutator motors. Selection among these is guided by the required range of rotary displacement, size limitations, maximum torque, cost and energy constraints. Electrically operated actuators may rely on one or more pairs of stator poles that generate an electromagnetic field, usually including either a ferromagnetic or permanent magnet rotor that responds to this field. Rotary solenoids generally operate through a small range of rotary displacement, due to a potentially rapid loss of magnetic field strength or limits on related axial motion. An operating range of 45° may be increased to over 90° by incorporating multiple stator poles, as illustrated by the Ledex BTR® rotary solenoid design. Another potential method of extending rotary displacement is to selectively excite multiple stator poles to create the effect of a rotating magnetic field, exemplified in U.S. Pat. No. 5,786,649. A closely related method of extending rotary displacement may include attaching either synchronous or stepper motors to the rotated shaft, as described in U.S. Pat. No. 4,672,247. An additional and commonly employed method may incorporate a direct-current (DC) excitation current with brushes and commutator to maintain magnetic field strength independent of rotational position.

These existing rotary actuators may pose several design limitations relative to operating an axially rotated valve such as the VOST™ valve, as described in U.S. patent application Ser. Nos. 08/925,535 and 09/121,650, now U.S. Pat. No. 6,026,845, and in international application No. PCT/US98/18333, all hereby incorporated by reference. Conventional rotary solenoids may not provide the required 180° of rotation. Synchronous and stepper motors may not provide sufficient torque-to-size ratio to be practical in the VOST™ application, due to potentially smaller magnetic flux areas than solenoids of similar size. Synchronous and stepper motors, and including direct-current motors, may generally add unwanted cost, piece count and complexity.

Another potential limitation of existing rotary solenoids is the inability to latch in both the open and closed positions without a holding current. Many rotary actuators designed for binary valve positions have a quiescent and an energized state. Electric current is generally required to maintain the actuator in its energized state. For example, current must be supplied to a normally closed, rotary solenoid valve to hold it in the open position. Incorporating an actuator requiring an energized state for actuation increases the cost of energy and the challenge of heat removal in certain applications. Latching valves do exist that address this problem by exploiting the fluid pressure to hold the valve in position, exemplified in U.S. Pat. No. 4,672,247. This approach, however, requires a more complex fluid flow path, adding mass and cost to the valve.

SUMMARY OF THE INVENTION

The actuation system of the present invention addresses the inadequacies that may have existed with prior valve actuator systems. Accordingly, the present invention provides a valve actuation device and method for actuating axially-rotated valves. The present invention may even be considered in some aspects as a development away from that which was previously known in the art of valve actuation.

One embodiment of the invention may provide valve actuation comprising an actuation providing a first movement direction and wherein an actuating element is positioned outside of the flow path of the valve and actuates the valve without interfering with the flow of the valve. Actuation, therefore, may occur without interference to valve flow.

An embodiment of the invention may additionally provide a second actuation having a second movement direction non-congruent, and in preferred embodiments orthogonal, to a first movement of a first actuation.

An additional embodiment of the invention may further provide for guiding the valve during actuation. In preferred embodiments the guiding may be provided by guide elements, preferably bearings and bearing guides, to orient and provide rotational force or torque to the valve.

In particular and preferred embodiments, the actuation system may be provided through axially and radially oriented electromagnetic fields combined with mechanical conversion of axial to rotational motion. A rotary actuator may be provided that is attached to and operates the valve by means of a briefly applied direct current. The actuator may contain a main electrical winding and an armature, preferably shaft mounted, that together may produce axial thrust, and auxiliary electrical windings that exert a biasing torque or force on a preferably shaft-mounted, permanent magnet or armature. From either opened or closed position, this combination of thrust and torque may rotate the valve, and in a preferred embodiment in a helical motion, to the opposite valve position, and may allow for valve seal contact to be restored when actuated, and in preferred embodiments excitation current, is curtailed. In preferred embodiments, a combination of roller bearing guides and biasing torque may ensure full rotary motion as well as latching in the open or closed position of the valve.

It is an object, therefore, of the present invention to provide a novel system for actuating axially-rotated valves.

In particular, it is an object of the present invention to provide sufficient rotary displacement for valve actuators. A goal of the present invention therefore is to provide an axially-rotated valve actuation system that overcomes limited rotary displacement that may have resulted from previous rotary actuator systems. In particular, it is a goal of the present invention to provide axially rotated actuation of the VOST™ valve through 180° of angular displacement.

Furthermore, it is an object of the present invention to provide sufficient torque to effect proper valve actuation for axially-rotated valves. A goal of the present invention, therefore, is to provide adequate torque, for example in high-pressure valve applications, to alternate valve positions, and preferably within a minimum amount of time. It is an additional goal of the present invention to provide adequate torque to operate particular axially-rotated valves such as the VOST™ valve.

A further object of the present invention is to provide an actuator for axially-rotated valves that allows the valve to remain in an open or closed position. A goal of the present invention, therefore, is to provide a valve actuation system that provides a fail-safe or fail-in-place feature that maintains the valve in an open or closed position and further allowing for the actuation system to be deactivated when the valve is opened or closed.

A further object of the present invention is to provide a hermetic seal between the fluid and environment in a valve actuation system. A goal of the invention, therefore, is to eliminate the need for valve stems and associated packing glands or seals. A further goal of the invention is to provide an actuation system that provides for actuation of a axially-rotated valve without interfering with flow through the valve.

It is a further object of the present invention to minimize internal valve seal wear that may occur over prolonged periods of valve actuation. A goal of the invention, therefore, is to provide an amount of reciprocating axial displacement during actuation to minimize seal wear. It is an additional goal of the present invention to provide adequate axial displacement during actuation of the VOST™ valve's rotating and stationary tubes to minimize seal wear.

It is further an object of the present invention to eliminate a possible need for manual actuation of a valve. A goal of the invention, therefore, is to provide a valve actuation system that may operate in a remote and unattended fashion by providing actuation and responsive armature features that allow for non-manual valve actuation.

Other objects of the invention are disclosed throughout other areas of the specification and claims. In addition, the goals and objectives may apply either in dependent or independent fashion to a variety of other goals and objectives in a variety of embodiments.

BRIEF DESCRIPTION OF THE DRAWINGS

FIG. 1 illustrates the operating principles behind an electromagnetic component of a preferred embodiment of the actuator design.

FIG. 2 illustrates a preferred embodiment for associated valve control logic that may be implemented to control actuation of a valve.

FIG. 4 depicts a preferred embodiment of an actuator and an axially-rotated valve.

DETAILED DESCRIPTION OF THE PREFERRED EMBODIMENT(S)

As should be understood, the present invention includes a variety of aspects that may be used in various combinations depending upon the application's needs. The invention is intended to encompass a variety of embodiments of a valve actuator. It involves both methods and devices to accomplish the various aspects explained. In addition, while some devices are disclosed, it should be understood that these may be varied. Importantly, as to all of the foregoing, all aspects should be understood to be encompassed by this patent both independently and in combination as set forth in the claims now or later issued.

It should be preliminarily noted that the term "at least one" as used in the following description and claims is not intended nor used in this disclosure to mean that other claims or descriptions not incorporating the "at least one" language cannot further include one or more like elements. More specifically, the language "at least one" is not intended nor used to change "open-ended" claims, inherently including devices or methods having additional elements or steps apart from those claimed, into "closed-ended" claims wherein devices or methods having additional elements would not be covered by such claims. Accordingly, the use of the transitional phrase "comprising" is used to maintain the "open-end" claims herein, according to traditional claim interpretation.

Furthermore, the term "translate" or "translating" as used in the following description and claims, with regard to valve movement, is defined as any movement of the valve or a portion thereof. The terms "translate" or "translating" is not to be limited to any particular physical movement, such as linear, nonlinear, rotational, congruent, non-congruent, orthogonal, but to incorporate any possible movement of the valve or a portion thereof.

As can be easily understood, the invention involves a valve (1) and a valve actuator (2). An exemplary embodiment of a VOST™ valve (1), incorporating an actuator (2) of the present invention and as described below, is depicted in FIG. 4. The valve actuator is an element which operates the valve to achieve its function. Most often this function will be movement for operation of the valve between open and closed positions. For example the operation accomplished by the actuator element (3) may be operation within some range bounded by more open and more closed positions. That is to mean that the actuator element may or may not achieve full operation. It may simply throttle something such as operation between a limited range or it may go from stop to stop, as in a valve which is operated from open to closed. Further, as shown the valve actuator (2) is optimized for operation on an axially-rotated valve, such as the VOST™ valve. This is only one embodiment. Certainly other possibilities exist. Further, beyond just the VOST™ valve, it may operate on any axially rotated valve, that is a valve where having a central axis through which a flow path is established and rotating about that central axis. Again, this is only one type of embodiment. Certainly the valve actuator (2) can be operated to actuate other types of valves regardless of whether they are axially rotated or not.

Figure 3A:
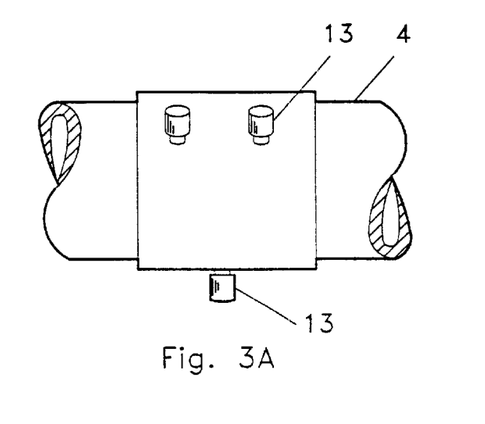
FIG. 3A depicts a preferred embodiment providing bearings mounted to a rotating tube of a valve.
Figure 3B:
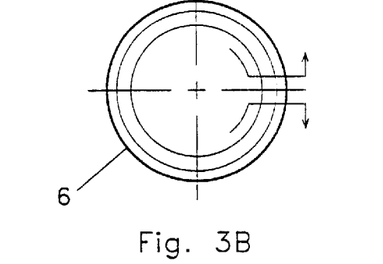
FIG. 3B depicts a preferred embodiment of an outer tube of a valve containing the bearing guides.
Figure 3C:
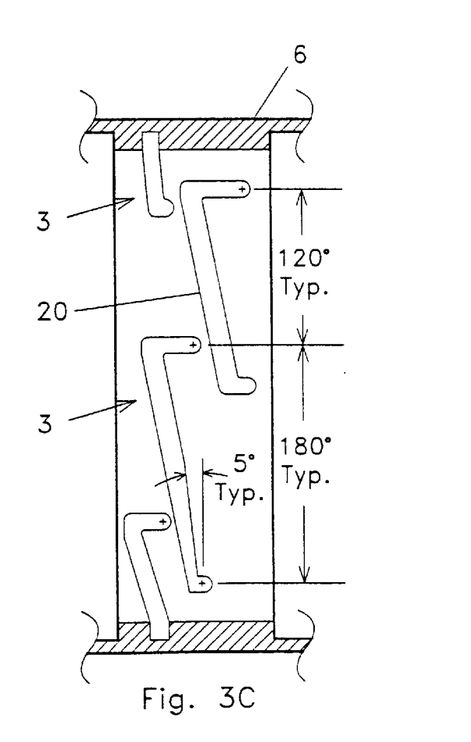
FIG. 3C depicts a flattened cross-section of the embodiment depicted in FIG. 3B.
Figure 3D:
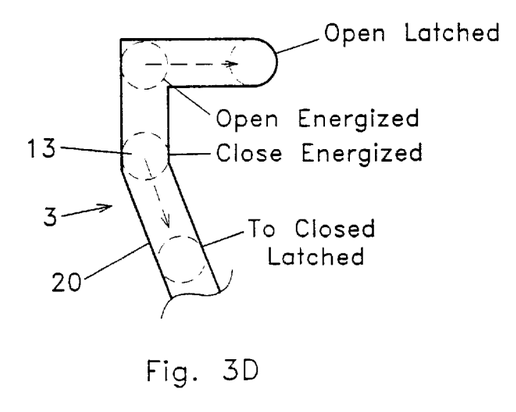
FIG. 3D depicts a preferred embodiment providing additional detail on the various positions of roller bearings in corresponding bearing guides.
Figure 3E:
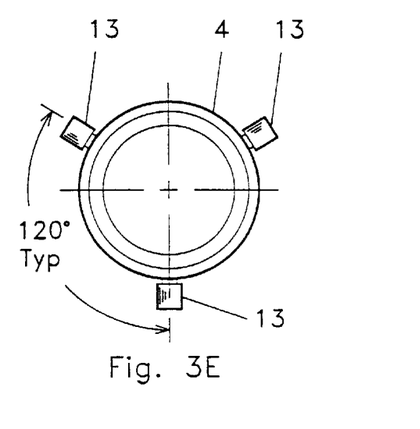
FIG. 3 illustrates a preferred embodiment incorporating a roller bearing assembly.
Figure 4A:
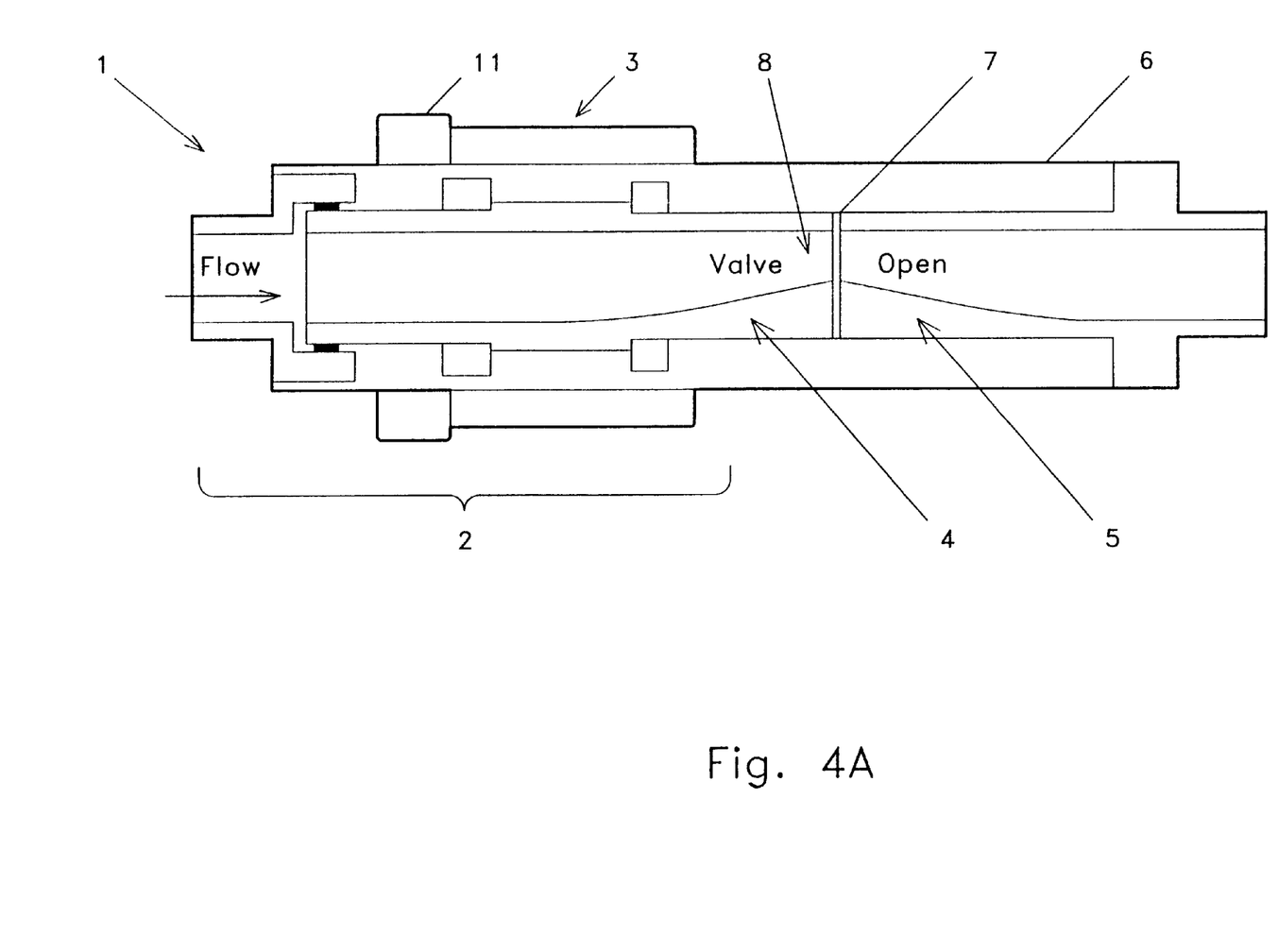
FIG. 4A depicts a preferred embodiment of an actuator associated with a VOST™ valve assembly.

The valve of the preferred VOST™ valve embodiment may comprise a rotating tube (4) and a stationary tube (5) and may include an outer tube (6). The actuator (2), in its VOST™ valve embodiment, establishes and maintains the valve-open and valve-closed positions by rotating the upstream half of the valve body, the rotatable tube (4) through 180°, although a greater degree of rotation may be provided. Both positions may be maintained securely by a compression spring (10), shown in FIG. 4B. The spring also ensures contact between the rotating tube seal (7) and the downstream half of the valve body, or the stationary tube (5), as shown in FIG. 4A, whether in an open or closed position. An open position of the VOST™ valve is shown in FIG. 4A. Between these two positions, bearing guides (3), as shown in FIGS. 3C and 3D, convert axial force to rotary motion, and further effect a cam-type seal separation (FIGS. 3C and 3D), as further described below.

Figure 1A:
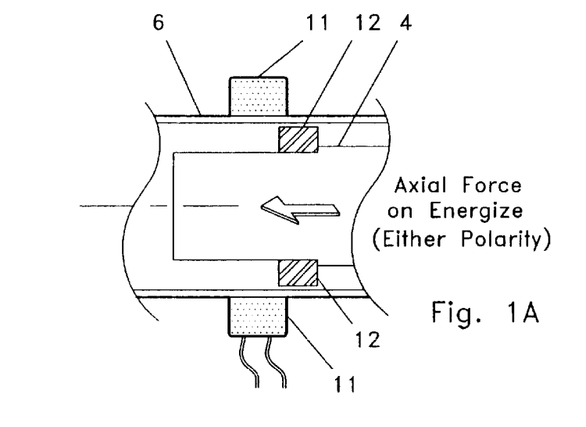
FIG. 1A depicts a preferred embodiment of a main coil and armature, which are magnetically coupled to provide axial thrust to a rotating member of the valve body.

In a preferred embodiment, a main winding or stator (11) is attached to the outer tube (6) (FIG. 4B), which hermetically seals the environment from the valve internals and fluid. This stator is excited with a DC current, creating an axially oriented magnetic field. This field preferably exerts an axial, attractive force on a ferromagnetic armature or rotor (12) attached to the rotating tube (4), as the two form a magnetic circuit that seeks maximum magnetic flux density, as depicted in FIG. 1A. The stator and rotor are in a preferred embodiment separated by the outer tube (made of nonmagnetic material) and a small air gap. During stator excitation, the axial force on the rotor (12) is transformed into rotary motion, in a preferred embodiment, by three roller bearings (13) mounted to the rotating tube (FIG. 3A) and constrained, in an additional embodiment, by helical bearing guides (3) fixed to the stationary outer tube (6) (FIG. 3B). The bearing guides are shaped for purely axial motion at the onset of either opening or closing the valve, as shown in FIG. 3C. This reduces seal wear by delaying rotation until after separation, and better utilizes the axial thrust provided by the main winding (11). The bearing guide shape also allows snap-back axial motion once the valve has turned to its fully open position, thus re-engaging the valve seal surfaces, including rotating tube seal (7).

Figure 4B:
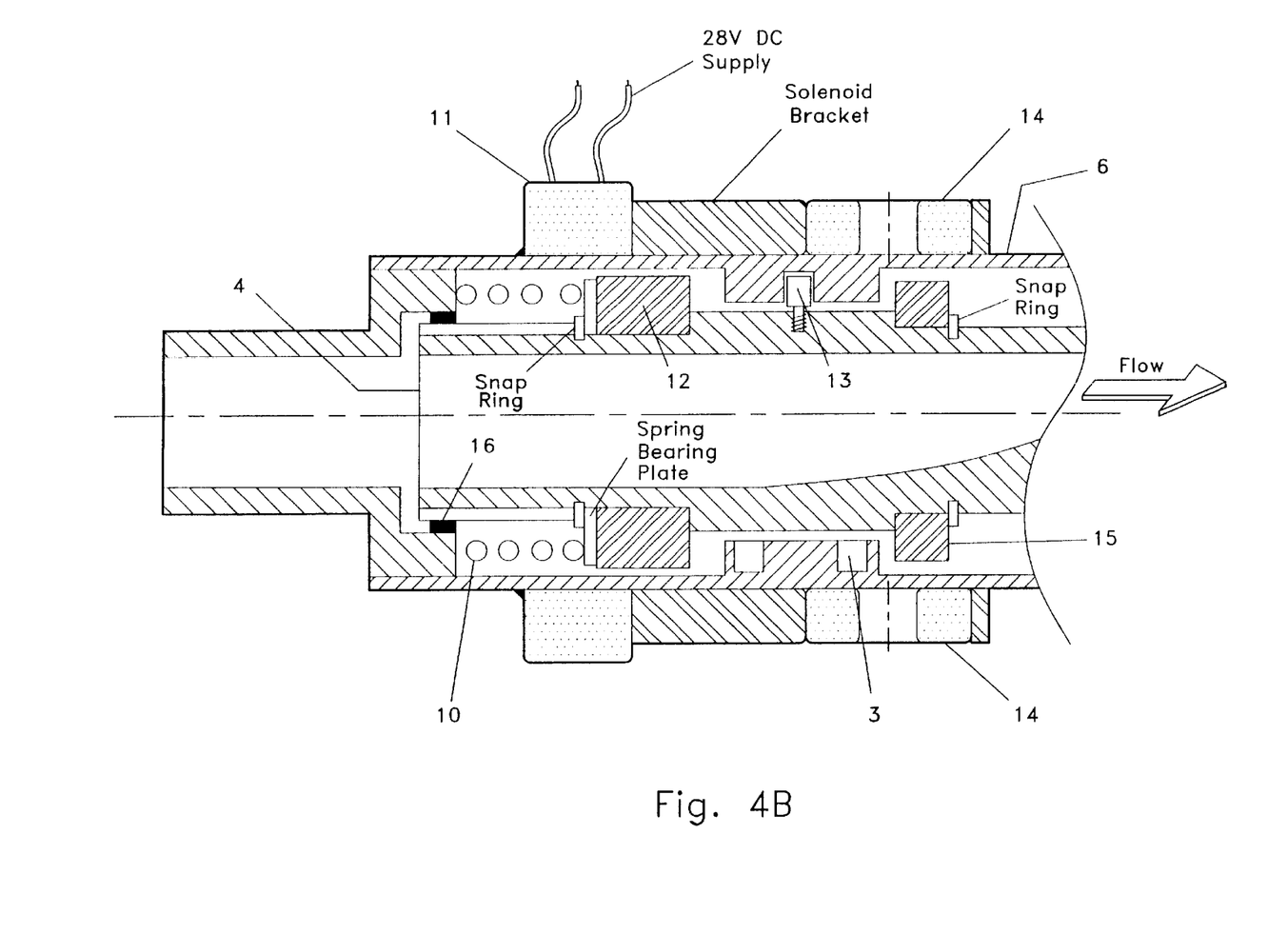
FIG. 4B depicts a preferred embodiment of a detailed actuator design.
Figure 5:
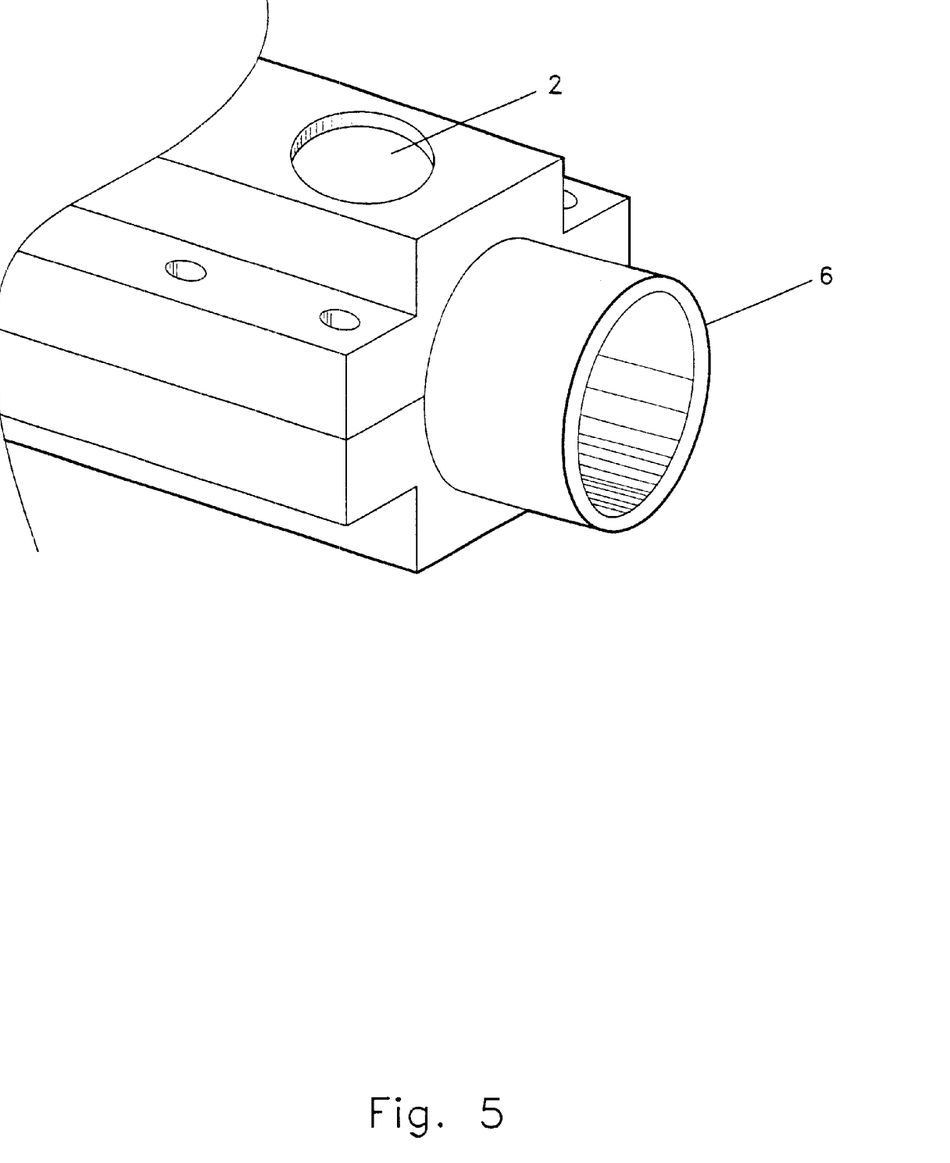
FIG. 5 illustrates a preferred embodiment of a mount for auxiliary windings associated with a VOST™ valve outer tube.
Figure 6A:
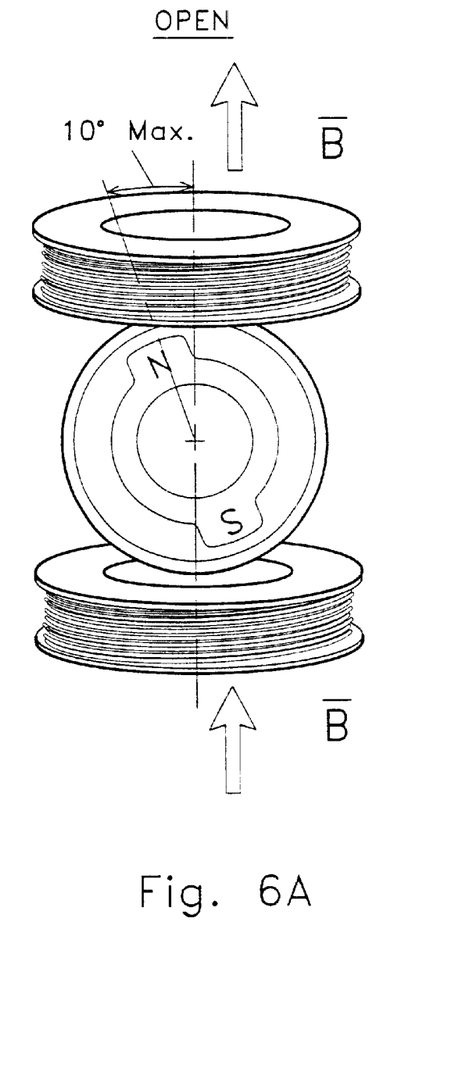
FIGS. 6A and 6B depict an embodiment of coils and a rotating permanent magnet, which are magnetically coupled to provide a polarity-sensitive, biasing torque to a rotating member of a valve in the valve open position and closed position, respectively, without an axial actuator.
Figure 6B:
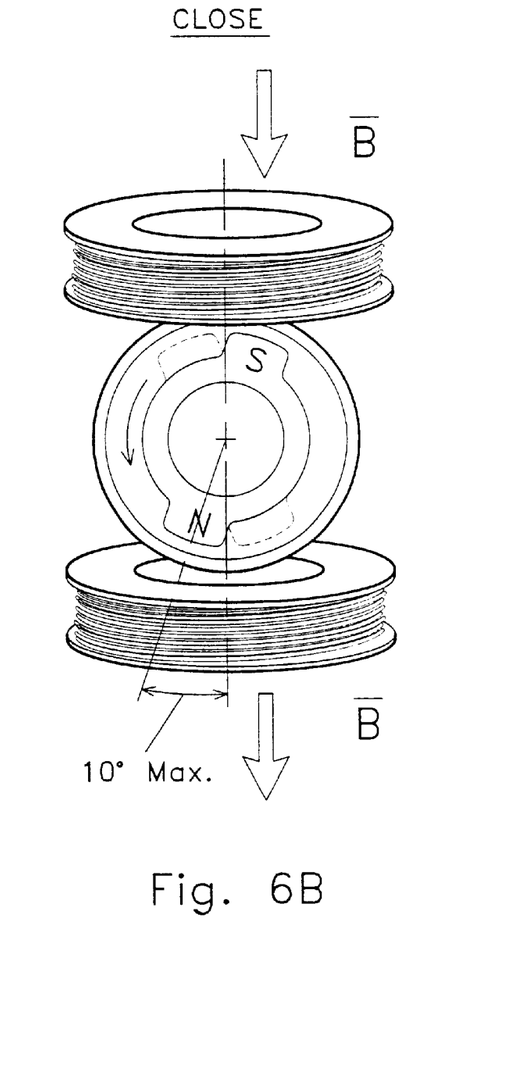

In its more general sense, the foregoing should be understood as representing main and secondary actuator elements. For example, the main winding (11) shown as a stator is simply any element which serves as a main actuator element (11). Similarly, the auxiliary winding (14), as shown in FIG. 4B, can serve as a secondary actuator element (14). Importantly, in an embodiment having a main and a secondary actuator (the terms main and secondary may be viewed as arbitrary, of course) some element of or within the over all valve is in some fashion responsive to one or more of these actuator elements.

One preferred way of utilizing the actuator elements is to utilize armatures which are responsive to the actuator elements. Thus, the device may have a main armature element which is responsive to the main actuator element. Similarly, a secondary armature element may be provided responsive to the secondary actuator element. As a secondary armature, it may have a different type of response, for instance it may respond in a rotational direction whereas a main actuator may respond in a different type of direction. The valve itself may be operated by activating one or more actuator elements and inducing some type of response from one or more armature elements. For example, when activating the main actuator element, that element may induce a response from the main armature element and thus move some item within the valve assembly. Similarly, activating the secondary actuator element may induce a response from the secondary armature element. This response may be direct or indirect. Further, it should be understood that by the term armature, the armature element may be any item which simply responds to the appropriate actuator element. The armature elements are depicted generally as main armature (12) and secondary or auxiliary armature (14) as a preferred embodiment.

The actuator is designed for efficient energy conversion to deliver maximum torque (per unit mass) to the VOST™ valve. The valve itself is designed to require minimum torque, thus minimizing the mass of the actuator. Energy conversion efficiency is achieved preferably by the roller bearings (13) shown in FIG. 3A, which minimize friction. The bearings are spaced 120° apart and axially offset to avoid mutual interference (FIG. 3B). Equal spacing assures a stable, bind-free rotation. A preferred embodiment providing roller bearings enables the actuator (2) to absorb thrust force, minimizing wear and eliminating phasing problems associated with spherical bearings used in rotary solenoids. Both the seal separation and the tube rotation are thus achieved with low friction.

As mentioned above, the concept of minimizing friction can be an important aspect to some embodiments. This can be most easily understood in the context of the VOST™ valve shown. As may be understood, the VOST™ valve involves two elements which effect a seal (7) in the vicinity of the narrow portion of the venturi (8), as shown in FIG. 4A. This sealing force may be reduced or altered in some fashion in the operation of the valve. As can be understood from the figures, an axial translation may move one portion of the split venturi away from the other thus reducing the sealing force. It may even unseal the item with respect to the other venturi portion. As may be understood, it may be advantageous to include some type of back flow seal (16), as shown in FIG. 4B, to keep the entire valve mechanism sealed during this type of operation. The step of reducing the sealing force may thus be effected during the step of axially translating, or first translating some portion within the valve. This can have an important effect to help maintain the integrity of the seal and also to reduce the frictional force character and thus make rotation easier. This can, of course, permit rotation with lower forces. Thus, one of the actuators may serve as a frictional force characteristic alteration element or even as a seal force reduction element. Similarly the reverse movement may re-establish the sealing force or even re-establish the entire seal. This may, of course, occur after the step of axially rotating the valve as discussed later. As may be understood, reducing the sealing force may occur prior to the step of operating the valve that is prior to actually rotating the valve to achieve its desired result. Similarly, the step of re-establishing the sealing force may occur after the operation is complete. This, among other aspects, may serve as an operational force characteristic alteration element or to achieve the step of altering the operational force characteristics as discussed later. In general, understanding the operation of the valve may help in understanding each of these more general characteristics.

Valve opening occurs in a preferred embodiment as follows. When the valve (1) is momentarily energized from a closed position, the resulting axial force on the rotor or armature (12) initially produces a small axial motion by the rotating tube (4), as shown in FIG. 1A, due to the shape of the bearing guides (3), as shown in FIG. 3C. Axial motion is followed by rotational motion as the bearings (13) enter the helical section (20) of the bearing guides, as shown in FIG. 3C. Both the initial axial and the helical motions occur against the force of a compression spring (10) (FIG. 4B). At the end of the helical travel a second axial motion occurs. As the stator is de-energized, the axial force on the rotor is removed and the compression spring forces the bearings attached to rotating tube to move axially toward the end of the bearing guides until the rotating tube regains contact with the stationary tube. Accidental return along the helical portion of the guide path is inhibited by a biasing torque as described below. The valve is now in a stable open position with valve seals in contact.

In the foregoing, it should be understood that the variety of motions may be generally characterized as well. For example, the valve is translated in a first direction, perhaps an axial direction in one embodiment. After this translation, the valve may be translated, that is may achieve some type of movement, in a second direction. As may be understood from the example above, in one embodiment the axial translation or movement may be very different from the second type of translation. In fact, as may be easily understood from the difference between axial movement and rotational movement, the second translation or second movement may be a non-congruent direction, that is a direction which does not simply retrace the path of the first movement. Thus, the valve may achieve a first movement direction and a second movement direction. By utilizing the term non-congruent, it is intended to distinguish over items which simply retraces a given path or achieve a congruent movement. As may be understood from the above example, the valve may be actuated with the first linear movement, that is movement in a roughly single direction along a set linear path. As the valve achieves this, it may even be an axial direction in which the first movement occurs. Such an axial translation may be achieved through an axial movement actuation element such as the main actuator (11) and (12). This may of course be followed by the non-congruent translation such as the rotational movement as discussed above. This rotational movement may also be achieved through a rotational movement actuation element. As may be understood with respect to the guides, the first linear movement may actually reposition the valve, or more accurately, a portion of the valve, prior to the second movement rotation. In one embodiment the two movements may be substantially orthogonal such as in the example where the axial movement is followed by a rotational movement. By substantially, it should be understood that a great variety of movements are encompassed even though not strictly orthogonal in sense. Substantially orthogonal may thus encompass movements from 90° to even much less such as 70, 60 or even 45° in some embodiments. Similarly, the axial direction may be a variety of directions depending on an axis for the valve. In this embodiment, the axial direction is anticipated to be parallel to the central axis of the valve, namely the flow path. Multiple movements, even first and second non-congruent movements are certainly possible as well. Similarly, multiple rotations in first and second directions are possible such as in a case a second direction simply retraces or reverses the first rotation or other movement.

An aspect alluded to earlier is the aspect of operational force characteristics and how this actuator can vary or alter such characteristics. By the term "operational force characteristics" it should be understood that the design deals with not just forces but the characteristic of the forces. Thus, while forces may vary, change or reverse in traditional operation, it should be understood that this type of change is not one within the concept of varying an operational force characteristic. For example, in a situation where forces vary due to the angular displacement off of the desired position, such is not considered an alteration of the operational force characteristic. It may literally vary the operational force but not the operational force characteristic. By "operational force characteristic," the entire character of the force, namely where the force comes from, how it is generated, or even the amount of integrated energy available throughout an entire movement can be varied. This can be significant in some embodiments of the actuator in which the design can provide for altering operational force characteristics or even an operational force characteristic alteration element. Both general and specific examples may be helpful in understanding the terms "force characteristic."

Generally, if a force is augmented by a separate type of force, if a force has a different overall character (such as when an armature is laterally moved within a magnetic field as but one example), if a force is generated by a rotational causing source and then generated by a linear causing source, or the like, the character of the force changes. In one facet, this can be considered true even if the exact forces resulting are identical. In others the differences in the resulting forces themselves may be an indicator that the character of the forces is different. As a specific example, in the situation shown in FIGS. 1B and 1C, it may be understood how the rotational force characteristic, namely in this example, the total amount of force available at any given position can be varied. Here, the armature (15) indicated by the north-south drawings can move more central to the magnetic field provided by the axillary coils (14). Thus, the rotational force characteristic can be varied by treating the armature to a more intense magnetic field or more accurately, a more intense magnetic field flux. In this fashion, an alteration of the operational force characteristic can occur. Naturally, this can occur at any stage and in the present preferred embodiment, it can occur prior to accomplishing the step of operating the valve and after accomplishing the step of operating the valve. It may also occur during the step of operating the valve as may be understood from the discussion of the guides (3) below where it can be seen that the armature (15) moves while rotating to or away from the central portion of the magnetic field. It may thus move on center or off center depending upon the operation occurring. In this fashion, the operational force characteristic alteration element may operate prior to, after, or during move operation between more open and more closed positions.

As can be understood from the foregoing, the rotational force characteristic can be altered in the actuator or through operation of the actuator as well. In achieving the step of altering rotational force characteristics, the guide (3) or some other aspect may serve as a rotational force characteristic alteration element. It may even include some type of axial movement actuator such as the main actuator (11) and (12) discussed earlier. Thus, rotational force characteristic alteration can occur by actuating axial movement within the valve. This may also reduce rotational torque characteristics mainly the portion of the rotational force that is due to the torque of the secondary actuator or the like. While the rotational force characteristic may vary due to over all rotational movement forces, the rotational torque characteristic may vary due only to alteration of the magnetic rotation element (14) and (15), or the like. Through such a rotational torque characteristic alteration element one aspect of the over all rotational forces can be altered. As may be understood from FIGS. 1B and 1C and the discussion above, the rotational force characteristic may be increased such that a greater degree of rotational force can be provided. This can be significant as discussed in the aspect of optimizing the forces below. It may thus serve to provide a greater rotational force at a position where the linear force is not able to augment or assist the rotation of the valve portion. For example, with the guides (3) chosen and as shown, it may be desirable to provide an open position rotational force characteristic increase element such that the rotational force characteristic is altered in a positive way, namely, it is increased when the valve is in a more open position. Thus, the rotation itself may guide and cause linear movement or at least assist linear movement and thus affect its own force characteristic alteration.

As mentioned earlier an aspect which may be important in some embodiments is the concept of altering a frictional force characteristic of the valve. Again, because a frictional characteristic is merely a sub-set of the operational force characteristics, the alteration element may serve as a frictional force characteristic alteration element. It may even serve to reduce the frictional force by axial translation away from the field. In such an axial movement actuator, the frictional force characteristic reduction element (11) and (12) would provide for linear movement and thus reduce the amount of frictional force caused by the seals or other aspects of the valve.

As also alluded to earlier, the actuator (2) may provide for an arrangement in which forces are optimized for the demands of the valve. This may include fluidic demands in which it may require more force to operate the valve in high flow situations rather than low flow situations. Similarly, turbulence or other aspects may come into play. As shown, the valve actuator itself can serve through some elements as a force optimization element in which rotational force characteristics are enhanced when the valve is at a more open position, for example. This enhancement may of course be increasing the rotational force characteristic. Similarly, optimizing forces, or the force optimization element may include aspects such as the aspect which serves to reduce the frictional force characteristics of the valve prior to rotational movement. Naturally, in a reverse operation the opposites may also be possible. Reverse operation may be most easily understood by discussing the particular preferred embodiment, namely the VOST™ valve.

Valve closure may preferably follow a reverse path or actuation from valve opening. When the main winding or stator (11) is momentarily energized from the open position, the axial attractive force on the rotor (12) produces an initial axial motion, separating rotating tube from stationary tube. This motion also compresses the spring (10), as shown from FIGS. 4A, 4B and FIG. 3C. At the end of the axial motion, a reverse biasing torque (described below) produces a slight rotation of the rotating tube (4), such that when the stator (11) is de-energized the compression spring (10) returns the rotating tube along the helical bearing guides (3) (FIG. 3B) toward the closed position. The bearing guides force a transition from helical to axial motion as the valve achieves full and stable closure with valve seals in contact.

As may be easily understood from the foregoing, reversal of the operation of the valve may be primarily provided by reversing the current polarity of any number of actuators or by reducing or eliminating the actuation. This may exist when biasing is provided as discussed later. The entire reversal process may also be viewed as a second type of response or a second rotational direction or a second translation or a second linear direction. Again, these may or may not be congruent depending upon the design. They may also be guided by the design itself as can be understood with reference to FIG. 3C.

Figure 1B:
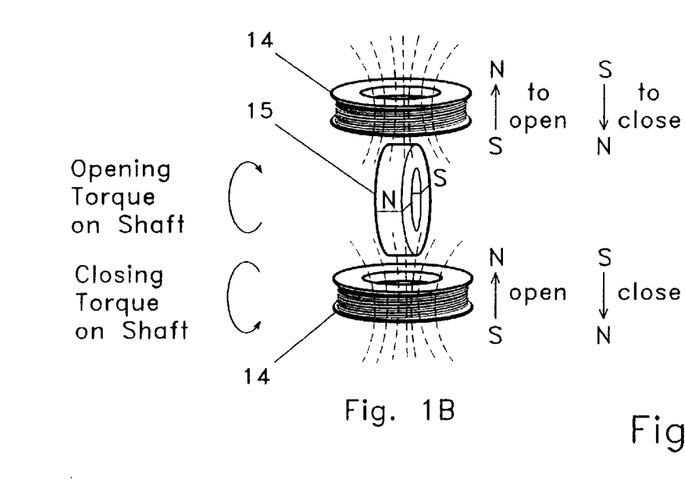
FIG. 1B depicts a preferred embodiment of auxiliary coils and a rotating permanent magnet, which are magnetically coupled to provide a polarity-sensitive, biasing torque to a rotating member in the valve open position.
Figure 1C:
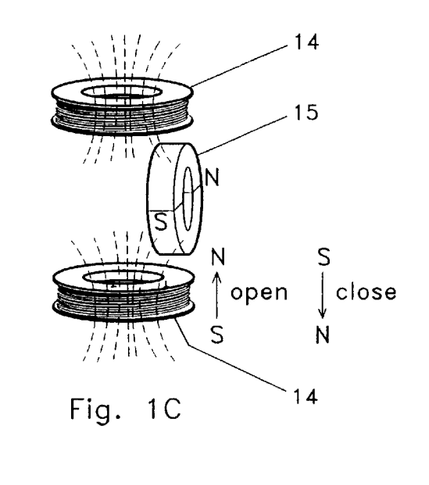
FIG. 1C depicts the preferred embodiment of auxiliary coils and a rotating permanent magnet in the valve closed position.
Figure 1D:
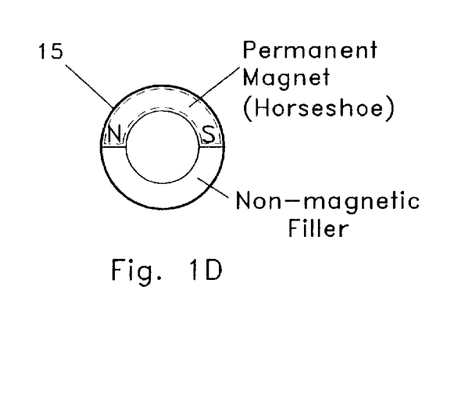
FIG. 1D depicts a preferred embodiment of a permanent magnet construction.

FIG. 3D presents a detailed sketch of a preferred embodiment of a typical bearing guide at or near the valve-open position. A short, flat section in the corner of the guide is oriented transverse to the valve axis. Purely axial forces would not be sufficient to reliably force the bearings "over the hump" between the valve-open position and impending closure. Therefore, in a preferred embodiment, a biasing torque is applied to the rotating tube (4) by means of auxiliary windings (14) attached to the outer tube (6) and a permanent magnet (15) attached to the rotating tube. The two auxiliary windings, when electrically excited, exert a torque on the permanent magnet as the magnet attempts to align with the induced field, as shown in FIG. 1B. This torque reverses direction as the polarity of the current in the auxiliary windings is changed, as shown in FIG. 1C. The torque does not act uniformly throughout the 180° of angular motion, but only becomes effective when the rotating poles of the permanent magnet (15) approach alignment with the stationary poles of the auxiliary windings (14).

As may be understood, the bearing guides (3) are one type of guide element, namely one which accommodates bearings or the like. The bearing guide itself may involve a variety of portions which provide different directional movements. For example, a first portion may provide axial directional movement; a second portion may provide purely rotational movement; a third portion may provide a combination of axial and rotational movement; and a fourth portion may provide axial movement. Again, first, second, third, fourth and the like are simply arbitrary terms and should not be viewed as limiting to any particular type of movement. They simply are intended to provide distinguishable movements relative to the operation envisioned for the particular embodiment. Thus, the bearing guide (13) as shown in FIG. 3C may include at least one portion which is substantially parallel with an axial direction. This may serve as a fail safe element as discussed later. A second portion may also include a helical portion (20), that is, a portion which tracts or moves along a roughly helical path. Again, by helical it may be helically shaped not necessarily describing a full helix path. By translating the valve, or in a preferred embodiment the rotatable tube (4), along the bearing guide (3), it may translate through the various portions and achieve the various directional movements as shown.

As can be understood from the guide envisioned in a preferred embodiment, a variety of movements can be provided. These movements may be linear and may even be substantially orthogonal. For example, a first linear movement may be axial, a second linear movement may be movement down along a helical portion (20) of the guide, and a third linear movement may be another reverse axial movement. Each of these may be achieved through the appropriate linear movement actuation elements which may be portions of the guide (3) with actuator elements. Each type of linear movement may also be reversed and thus a reversed linear movement actuation element may be provided. The linear movement may of course be strictly linear movement, namely the resulting movement which is substantially in one direction or otherwise.

As may be understood from the guide discussion, it may be seen how a preferred embodiment may include a bias element or a spring or the like which serves a variety of purposes. These may include locking the valve in a desired position in the event of electrical failure or the like. The bias element may also be secondary armature elements or the like which assist and even bias certain types of movement. One aspect of the spring design of the bias element is that it can serve to assist the rotational force provided by a secondary actuator by forcing the valve element to move along a desired path and thus achieve rotation. This may, of course, occur while accomplishing the step of achieving a rotation and thus bias assisting the rotational force can exist. In such a fashion the bias element may act concurrently with another actuator element. As mentioned, the bias element may be as spring bias element or any other design which achieves an over all bias force. For example, by the spring actuation (10), the valve may be rotationally biased in one portion of the guide (3) and not rotationally biased in other portions or the guide. This may occur, according to the example, where rotational bias is provided in a helical portion (20). The spring (10) may also serve to assist in axially compressing the valve and thus may assist in re-establishing a seal force or the like.

As may be understood in positions where the guide serves not to enhance rotational movement, but rather to limit any further movement of the valve, the valve may be designed to include at least one fail-safe element and may thus provide operation in a fail-safe manner. By this it is meant that in some type of operation an undesired movement may be limited so as to not likely exist in the event of some type of failure. For example, in the concept shown, electrical failure may be accommodated in a fail-safe manner by providing a spring element (10) which can serve to lock the valve in one position or another. The fail-safe manner of operation may also be provided by de-activating a main actuator or the like and thus permitting the guide to serve to restrict rotational movement. It may thus latch the valve in one position or another, open or closed. The latching feature is most particularly shown as the axially aligned portions of the bearing guide (3), as shown in FIG. 3D, to restrict movement of the valve, and more particularly, bearing (13).

As mentioned earlier, the valve may be operated through magnetic designs. In this fashion the actuator may serve to magnetically induce movement of an armature or the like. In a situation in which operational force characteristics are altered, there may also be a variation of the magnetic flux characteristic within the valve. As discussed earlier with reference to FIGS. 1B and 1C, the entire operation may include the step of varying the magnetic flux to which the actuator is subjected. This may be accomplished by moving the valve actuator within a magnetic field area within some type of range bounded by more centered and off-centered magnetic field positions. Thus the step of alternating a rotational force characteristic may be accomplished by a magnetic flux variation element which serves to re-position an actuator within the magnetic field. This may even be considered an off-center movement element as well.

As may be understood, a variety of magnetic designs may be employed. For example, the design of an actuator may include at least one magnetic field and the magnetic field may be created to achieve operation. The actuator may also include a second magnetic field which may be created. This may involve the use of stators, solenoids, ferromagnetic elements or even permanent magnetic elements as may be easily understood by those of ordinary skill in the art. Thus, in such an operation, an armature element may respond to a magnetic field in some fashion to achieve the desired movement.

As may be understood from the foregoing, sequential, concurrent, and other types of operations can be accommodated in a preferred embodiment, a main actuator may be operated for a first period of time after which, or perhaps even overlapping during which a secondary actuator may be activated for a second period of time. As may be understood concurrent operation may exist namely operation which at least overlaps for some portion of one of the two or other time periods.

Figure 2A:
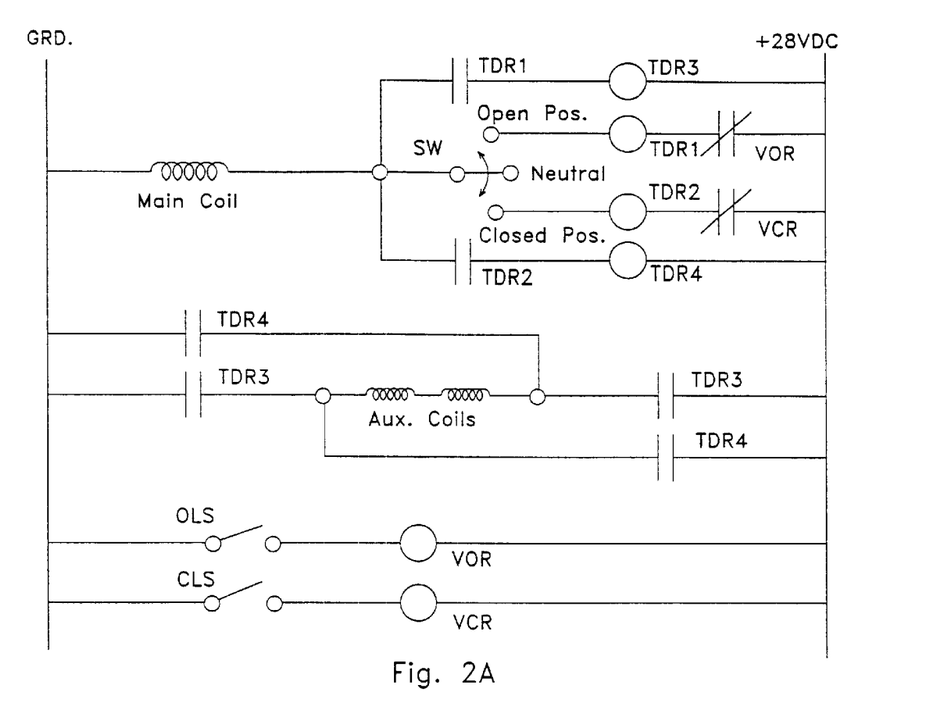
FIG. 2A depicts a preferred embodiment of a control circuit, with associated coils, switches and relays that may be implemented to control actuation of a valve.
Figure 2B:
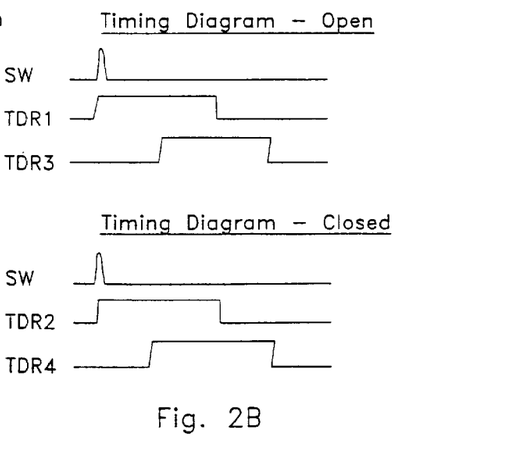
FIGS. 2B and 2C provide timing diagrams for valve opening and closing, respectively, during actuation in a preferred embodiment of valve actuation.
Figure 2C:
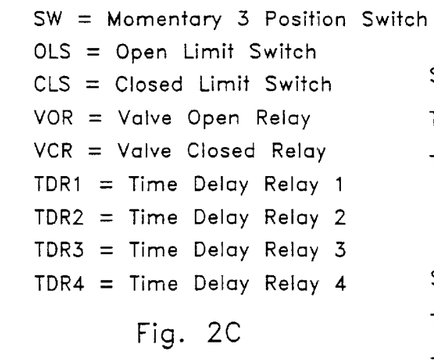

The timing diagram in FIG. 2B shows a slight time delay between excitation of the main winding and excitation of the auxiliary windings. It shows a similar delay between de-energizing the main winding and the auxiliary windings. The delay is shorter than the intervals of excitation, such that these intervals overlap (FIG. 2B). This ensures that the actuator bearings will fully rotate along the transverse portion of the bearing guides (near the open extreme, as shown in FIG. 3D) prior to de-energizing the main winding. When nearly open, the biasing torque reinforces opening action; upon impending closure this torque reverses to reinforce closing action.

The torque exerted on the rotating tube (4) by the combination auxiliary windings (14) and permanent magnet (15), is an order of magnitude smaller than the torque transmitted from the axial thrust exerted by the main winding (11) on the rotating armature (12). Thus, the permanent magnet torque dominates only at the extreme open end of the bearing guides where they assume a purely transverse orientation, as shown in FIG. 3D. In the valve-closed position, the magnetic coupling between auxiliary coils and permanent magnets is weaker due to the axial offset, as shown in FIG. 1C. If both windings were excited simultaneously, the lesser torque exerted in this position would slightly oppose, although not prevent, impending rotation. From the closed position, however, the delay between energizing the main winding and energizing the auxiliary windings provides time for the rotating tube to "wind up" to a position where the biasing torque reinforces, rather than opposes, the rotation imparted by the helical bearing guides.

One of the aspects which may be of great advantage is the fact that the actuator design can accommodate utilization of a low rotational force. By low, it should be understood that a variety of forces are envisioned including but not limited to forces which are less than a standard amount of force used to rotate such a valve. This may be achieved by reducing the frictional force as discussed earlier, or it may be achieved by augmenting the rotational force through linear translation or forces which may serve to guide the valve in a rotational manner. In such a fashion it is even possible that the rotational force can be an order of magnitude or less than the amount of rotational torque induced as a result of linear or other actuation. In this fashion it may even be possible that the rotational force simply serves to resolve any ambiguity at a point of indecisive travel such as might exist in between the first and second portions of the guide as shown. This may be significant because it may be that the second rotational actuation may be more difficult to achieve than the first or linear actuation.

FIG. 2A shows key elements of the control logic associated with the actuator described herein. A 3-position, momentary switch (SW) energizes the main winding or stator. This switch, operated manually or automatically by an external control circuit, normally occupies the neutral position. SW is moved momentarily to either the open or close position, energizing not only the main coil but also a time delay relay (TDR1 or TDR2). Each of the time delay relays has a set of normally open contacts wired to sustain the stator circuit otherwise interrupted when SW returns to neutral. A built-in time delay forces these contacts to return to open after a specified time period sufficient to fully actuate the valve. If the valve is already in the desired position, normally closed contacts on the valve open relay (VOR) or valve closed relay (VCR) inhibit completion of the stator circuit. The control scheme could be enhanced to require repeated attempts at opening or closure, or to activate an alarm, if actuation fails (as indicated by VOR or VCR). The time delay relays TDR3 and TDR4 provide closure for the auxiliary winding circuit, with a built-in time delay before closing the normally open contacts, and an additional time interval before re-opening the contacts. FIG. 2B provides the corresponding timing diagram. The wiring of multiple contacts on TDR3 and TDR4 (FIG. 2A) forces the DC polarity of the auxiliary winding to reverse between opening and closure of the valve.

The preferred embodiment of the actuator described herein is incorporated into the VOST™ valve for remote operation in hermetically sealed applications. Other potential embodiments include any rotary motion requiring angular displacements, torque-to-mass ratios, or latching features not available with rotary solenoids or motor-operated actuators.

As may be understood from the figures, a preferred embodiment is utilization of this type of actuator on a VOST™ valve. This valve is discussed in U.S. Pat. No. 6,026,845 hereby incorporated by reference. Such a valve may have a variety of characteristics which can be easily understood from the reference and from the drawings. This may include an actuated split venturi design in which at least one portion of the valve is rotated about a central axis. In this fashion the valve may be operated by shutting off the flow path down the central axis. The entire actuation elements may be provided about the venturi periphery, namely the portion in which pressure gradually reduces and then increases as it flows through areas of increasing or decreasing velocity according to Bernoulli principles or the like. By having the two valve portions fluidicly connected the first portion of the valve may be rotatable in a substantially parallel fashion to the flow path and thus throttle or completely operate the valve in an open and closed positions because the venturi periphery may not extend substantially beyond the outer periphery of the valve, more efficient designs may be provided. Thus flow may be controlled without interference of the flow path and by engaging substantially outside the flow path.

Each of the described embodiments could include various facets of the present invention. Some may include, for example and not by way of limitation, frictional or rotational force characteristic alteration elements, while others may not include such elements. Some may include varieties of rotational actuation. The market place and manufacturing concerns may dictate the appropriate embodiments for the present invention.

The foregoing discussion and the claims that follow describe only some embodiments of the present invention. Particularly with respect to the claims, it should be understood that a number of changes may be made without departing from the essence of the present invention. In this regard, it is intended that such changes—to the extent that they substantially achieve the same results in substantially the same way—will still fall within the scope of the present invention. The disclosure should also be understood as including all permutations and combinations of all elements and sub-elements presented.

As mentioned earlier, this invention can be embodied in a variety of ways. In addition, each of the various elements of the invention and claims may also be achieved in a variety of manners. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all action may be expressed as a means for taking that action or as an element which causes that action. Similarly, each physical element disclosed should be understood to encompass a disclosure of the action which that physical element facilitates. Regarding this last aspect, as an example, the disclosure of a "frictional force characteristic alteration element" should be understood to encompass disclosure of the act of "altering frictional force characteristics"—whether explicitly discussed or not—and, conversely, were there only disclosure of the act of "altering frictional force characteristics", such a disclosure should be understood to encompass disclosure of a "frictional force characteristic alteration element" or even a "frictional force characteristic alteration means." Such changes and alternative terms are to be understood to be explicitly included in the description.

It is simply not practical to describe in the claims all the possible embodiments to the present invention which may be accomplished generally in keeping with the goals and objects of the present invention and this disclosure and which may include separately or collectively such aspects as control elements and power connections, construction materials for the present invention. While these may be added to explicitly include such details, the existing claims should be construed to encompass such aspects. To the extent the methods claimed in the present invention are not further discussed, they are natural outgrowths of the system or apparatus claims. Furthermore, the steps are organized in a more logical fashion; however, other sequences can and do occur. Therefore, the method claims should not be construed to include only the order of the sequence and steps presented.

Finally, any references mentioned in the application for this patent as well as all references listed in any information disclosure originally filed with the application are hereby incorporated by reference. However, to the extent statements might be considered inconsistent with the patenting of this/these invention(s), such statements are expressly not to be considered as made by the applicants.

What is claimed is:

1. A valve actuator comprising:
   a. a main actuator element;
   b. a main armature element responsive to said main actuator element in a first direction;

c. a secondary actuator element;

d. a secondary armature element responsive to said secondary actuator in a second, non-congruent direction; and e. a valve element responsive to said main actuator element and said secondary actuator element and responsive in both said first direction and said second, non-congruent direction.

2. A valve actuator as described in claim 1 wherein said first direction and said second, non-congruent directions are substantially orthogonal.

3. A valve actuator as described in claim 2 wherein said first direction comprises an axial direction of said valve and said second, non-congruent direction comprises a rotational direction of said valve.

4. A valve actuator as described in claim 1 wherein said valve actuator is operable through about 180 degrees of displacement or more.

5. A valve actuator as described in claim 1 wherein said valve actuator is fully responsive in a period of time of about 500 milliseconds or less.

* * * * *